United States Patent [19]

Shimizu et al.

[11] 4,343,036

[45] Aug. 3, 1982

[54] IMAGE FORMING APPARATUS

[75] Inventors: Katsuichi Shimizu, Hoya; Shunichi Masuda, Tokyo; Hisashi Sakamaki, Yokohama, all of Japan

[73] Assignee: Canon Kabushiki Kaisha, Tokyo, Japan

[21] Appl. No.: 161,498

[22] Filed: Jun. 20, 1980

Related U.S. Application Data

[63] Continuation of Ser. No. 964,985, Nov. 30, 1978, abandoned.

[30] Foreign Application Priority Data

Dec. 2, 1977 [JP] Japan ................................ 52-144857

Dec. 2, 1977 [JP] Japan ................................ 52-144858

[51] Int. Cl.³ ........................ G06F 15/20; G06F 11/32

[52] U.S. Cl. .................................. 364/518; 355/14 C; 364/900; 371/20; 371/25; 371/29

[58] Field of Search ............... 364/101, 102, 200, 515, 364/518, 523, 580, 704, 900; 355/14 C; 371/20, 25, 29

[56] References Cited

U.S. PATENT DOCUMENTS 3,936,182 2/1976 Sheikh ................................ 355/14

4,099,236 7/1978 Goodman et al. .................. 364/200

4,133,477 1/1979 Marino et al. ........................ 371/20

*Primary Examiner*—Jerry Smith

*Attorney, Agent, or Firm*—Fitzpatrick, Cella, Harper & Scinto

[57] ABSTRACT

An image forming apparatus is provided with a first control unit having a program memory for controlling certain process executing members, and a second control unit having a program memory for controlling certain process executing members and said first control unit.

27 Claims, 23 Drawing Figures

IMAGE FORMING APPARATUS

This is a continuation of application Ser. No. 964,985, filed Nov. 30, 1978, now abandoned.

BACKGROUND OF THE INVENTION

1. Field of the Invention

The present invention relates to an image forming apparatus utilizing a control unit provided with program memories, for example an image forming apparatus utilizing, as said control unit, a one-chip microcomputer (hereinafter referred to as microcomputer).

2. Description of the Prior Art

The remarkable progress in electronic technologies in recent years has accomplished integration of electronic circuits and has provided highly advanced microcomputers which are now utilized for controlling various devices.

In the following there will be given an explanation on a conventional control unit utilizing a microcomputer for controlling an electrophotographic copying apparatus as shown in FIG. 1, of which functions are to be explained later.

In this connection reference is made to FIG. 2 showing a conventional control system for a copying apparatus, FIG. 3 showing a display switching subroutine, FIG. 4 showing the output timing wave forms of output terminals R1–R4 to be explained later, and FIG. 5 showing a procedure of parallel operations by a microcomputer of drum clock signal reading and display during copy cycle, said procedure being stored in an unrepresented memory in the microcomputer MCO.

In FIG. 2 there are shown a one-chip microcomputer MCO; a key input matrix KM; 7-segment display devices SET1, SET2, COPY1 and COPY2 composed for example of light-emitting diodes or liquid crystal display elements, wherein SET1 and SET2 are display devices for respectively indicating the first and second digit of the set number to be copied, and COPY1 and COPY2 are display devices for respectively indicating the first and second digit of the number of copies already made. There are also shown discretely settable and resettable output ports R, in which the port R1, in a set state thereof, i.e. when releasing a digital "1" signal, light the display device COPY2 and enables entry, into the ports K to be explained later, of the key input signal from the corresponding key "0", "1", "2" or "3" of the key input matrix KM. The actuated key is identified by the port K receiving said signal. The ports R2, R3 and R4 similarly light the display devices COPY1, SET2 and SET1 respectively and enable the entry of key input signals into said ports K. There are also shown an output port R5 for releasing a signal for lighting a jam indication lamp in case of a jamming in the copier, an output port R6 which is set to release a signal for reversing the optical system upon completion of optical scanning of an original, an output port R7 which is set at the start of said optical scanning to release a signal for advancing the optical system and lighting the exposure lamp, a paper feed signal output port R8 which is set, at the timing of starting paper feeding with a paper feed roller 28 continuously rotated after the start of copying operation, to activate a paper feed solenoid thereby lowering said paper feed roller 28 and thus initiating the paper feeding, and an output port R9 which is set at the turning on of the power supply to activate a main motor and a high-voltage transformer. The ports K are input ports for entering key inputs and allowing discrete check of the input signal. Also the ports X are input ports allowing discrete check of the input signal, wherein the port X1 receives a signal OHM indicating the arrival of the optical signal at a home position, while the port X2 receives clock pulse signals synchronized with the rotation of drum. The ports S release, from an unrepresented register in the microcomputer MCO, data of the first and second digits of the set number to be copied and of the first and second digits of the already copied number, as 4-bit parallel signals, to a display decoder DD which converts said data into 7-bit signals for display on said display devices SET1, SET2, COPY1 and COPY2.

FIG. 3 shows the display switching subroutine which functions, though detailed explanation for each step being omitted, to set the output ports R1 to R4 in succession thereby performing dynamic display and enabling input of key input signals from the key input matrix KM corresponding to said output ports R into the input port K. Thus, when the copy cycle is not in operation, the output signals from the output ports R1–R4 have a constant duty ratio as shown in the left-hand half of FIG. 4 as the program is only required to repeat the displays and the sensing of key entry signals.

On the other hand, even after the copy cycle is initiated, the dynamic display has to be continued though the entry of key inputs is no longer required. Also it becomes necessary to receive, from the input port X2, the drum clock pulses DCK generated mechanically, magnetically or optically and to count said pulses in parallel in order to trace the functioning position of the copier. FIG. 5 shows the flow chart of said operation, wherein the loop a corresponds to the duration of level "1" of drum clock pulses DCK shown in FIG. 6 and the loop b corresponds to the duration of level "0" of said drum clock pulses.

In the flow chart shown in FIG. 5, the program identifies, at the step 5-1, if the input port X2 receiving said drum clock pulses at a level "1", then executes the display switching subroutine if the port X2 is at level "1", proceeds at the trailing end of drum clock pulse DCK to the step 5-2 in which there is again identified if said input port is at a level "1", then executes the display switching subroutine if the port X2 is at the level "0", and proceeds to the step 5-3 at the leading end of the drum clock pulse DCK. In the step 5-3, 1 is subtracted from the data of the first digit of a pulse to be counted which is previously set and stored in a memory address A1 and the result of said subtraction is stored in said address A1. Said memory address A1 and other memory addresses A2 and A3 to be explained later store the numbers of pulses to be counted in a form of hexadecimal codes. In the succeeding step 5-4 the program identifies if the content of said memory address A1 has become 15, and, if not, returns to the step 5-1 to continue the pulse counting, or, if so, proceeds to the step 5-5 in which 1 is subtracted from the data of second digit of the pulse number to be counted which is previously set and stored in the memory address A2 and the result of subtraction is stored into said address A2. In the succeeding step 5-6 the program identifies if the content of said address A2 has become 15, and, if not, returns to the step 5-1. Similar identification is repeated also for the memory address A3 storing the third digit of the previously set pulse number to be counted until all the contents of said memory addresses A1, A2 and A3 become 15, when the output port R6 is set to release a signal for reversing the optical system.

Thus, if the drum clock pulse DCK is initiated after the resetting of port R1 and setting of port R2 in the display switching subroutine in the loop b, the program returns to the step 5-1 through the loop l unless the content of address A1 becomes equal to 15, and initiates the display switching subroutine to reset the port R2 and set the port R3. Since the time required for a single instruction of a microcomputer is constant, the output signals from the output ports R1 and R2 thus show significantly different duty ratios as shown in the right-hand half in FIG. 4, resulting in a difference in the durations of display by the display device COPY2 and COPY1 and thus in a flickering in the display. Also significant differences in the duty ratios for the ports R1 to R4 may hinder key input operation, disabling secure entry for example of a stop instruction during a copy cycle. Such drawback has been basically unavoidable as long as a microcomputer performs a sequential control.

SUMMARY OF THE INVENTION

The object of the present invention is to provide an image forming apparatus not associated with the drawback as explained in the foregoing, and, more specifically the object of the present invention is to provide an image forming apparatus provided with a highly reliable control unit adapted for controlling an image forming apparatus with a relatively large number of objects of control and input information.

Another object of the present information is to provide an image forming apparatus capable of inspecting the state of function of said apparatus and of control by the control unit.

BRIEF DESCRIPTION OF THE DRAWINGS

FIG. 13 comprising

FIG. 15 comprising

FIG. 16 comprising

DESCRIPTION OF THE PREFERRED EMBODIMENTS

Figure 1:
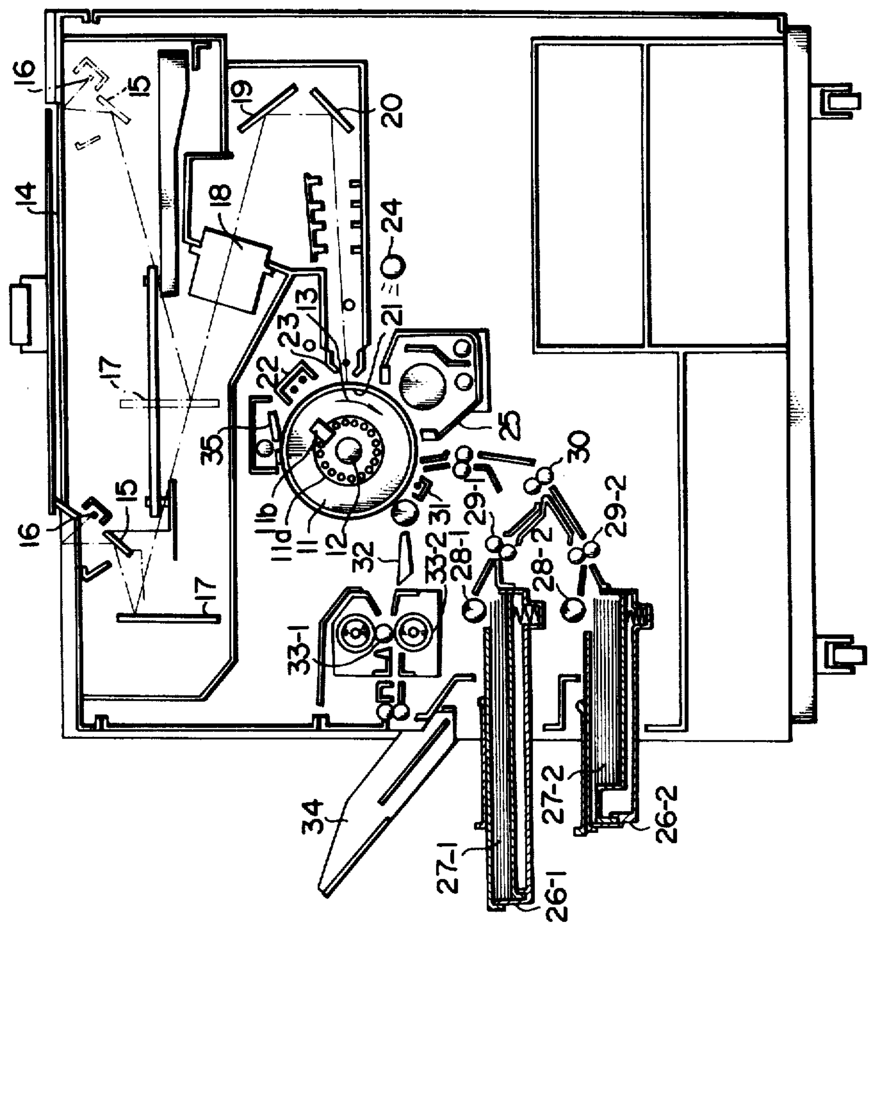
FIG. 1 is a schematic cross-sectional view of an electrophotographic copying apparatus in which the present invention is applicable.

Referring to FIG. 1 showing, in a cross-sectional view, a copying apparatus to which the present invention is applicable, a drum 11 having a three-layered photosensitive member utilizing a CdS photoconductive layer on the external surface is rotatably supported on a shaft 12 and initiates rotation in a direction of arrow 13 by a copy instruction.

When said drum 11 reaches a determined position, an original placed on an original carrier glass 14 is illuminated by an illuminating lamp 16 composed integrally with a first scanning mirror 15, and the reflected light is guided by said mirror 15 and a second scanning mirror 17, which are displaced at a speed ratio of 2:1 to perform scanning of said original, while maintaining a constant optical path length in front of a lens 18.

The thus reflected image is guided by said lens 18, a third mirror 19 and a fourth mirror 20 and is focused onto the drum 11 at an exposure station 21.

The drum 11, after being electrostatically charged (for example positively) by a primary charger 22, is subjected to a slitwise exposure of the image formed by said lamp 16, simultaneously subjected to an AC charge elimination or a charge elimination of a polarity (for example negative) opposite to that of said primary charging by a charge eliminator 23 and successively subjected to a flush exposure by a flush exposure lamp 24 to form an electrostatic latent image of an elevated contrast on the surface of said drum 11, said latent image being successively rendered visible as a toner image in a developing station 25.

A transfer sheet or paper 27-1 or 27-2 contained in a cassette 26-1 or 26-2 is supplied into the apparatus by a paper feed roller 28-1 or 28-2 and transported toward the drum 11 at a timing approximately controlled by a first register roller 29-1 or 29-2 and further precisely controlled by a second register roller 30.

The toner image formed on said drum 11 is transferred onto said transfer sheet or paper 27 while it passes between a transfer charger 31 and said drum 11.

Upon completion of transfer, the transfer sheet is guided to a conveyor belt 32, then further to a pair of fixing rollers 33-1 and 33-2 for fixing the toner image by heating under pressure and is finally ejected to a tray 34.

The drum 11 after the transfer is subjected to surface cleaning by a cleaning device 35 composed of an elastic blade and proceeds to a succeeding copy cycle.

For controlling the above-mentioned image forming cycle in various steps thereof, there are generated drum clock pulses DCK by means of a clock disc 11*a* rotating integrally with said drum 11 and a sensor 11*b* optically detecting clock dots provided on said disc 11*a*, said dots being provided so as to generate 360 pulses for a full rotation of the drum, or 1 pulse for every 1° rotation of the drum.

Now there will be explained in the following an embodiment of the present invention applied as a control unit for the copying apparatus shown in FIG. 1.

Figure 2:
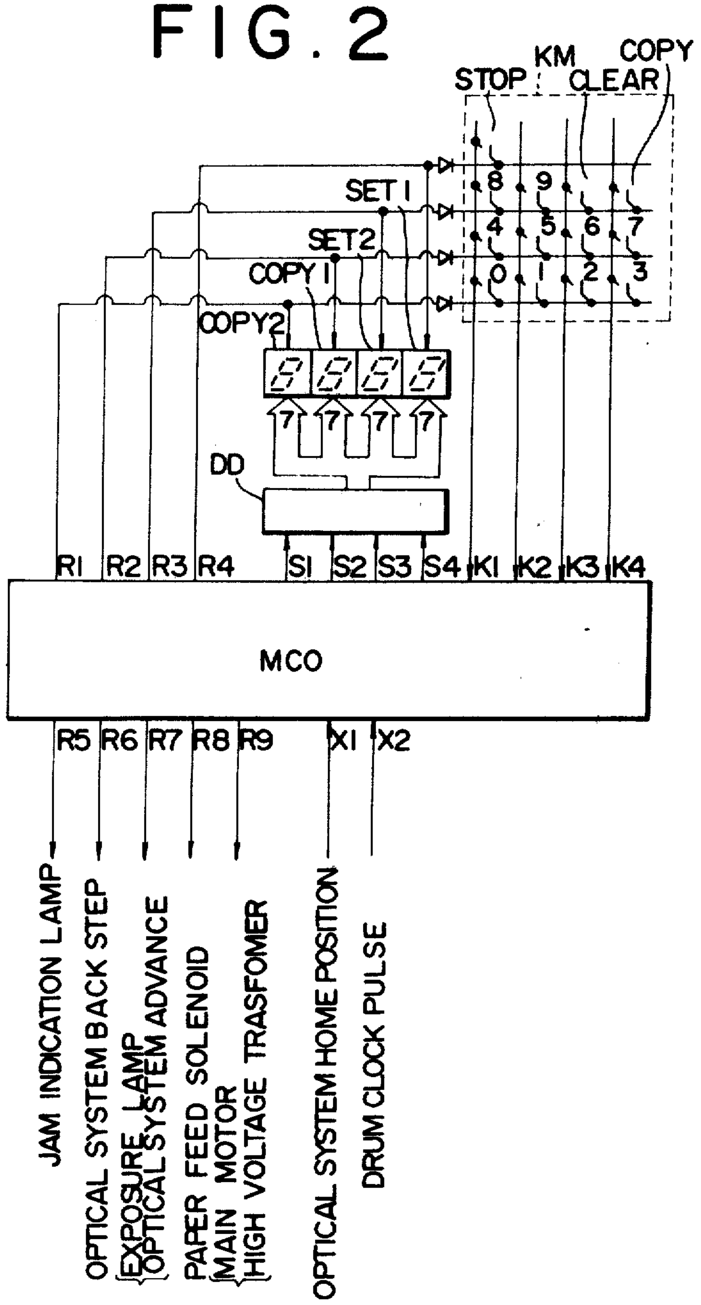
FIG. 2 is a schematic diagram of a conventional control system.
Figure 3:
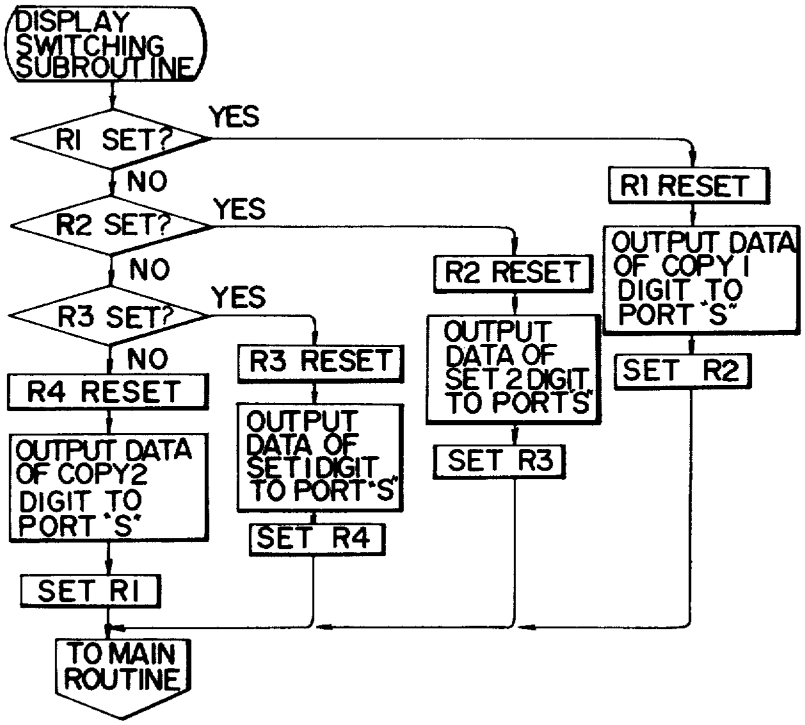
FIG. 3 is a flow chart of a display switching subroutine therefor.
Figure 4:
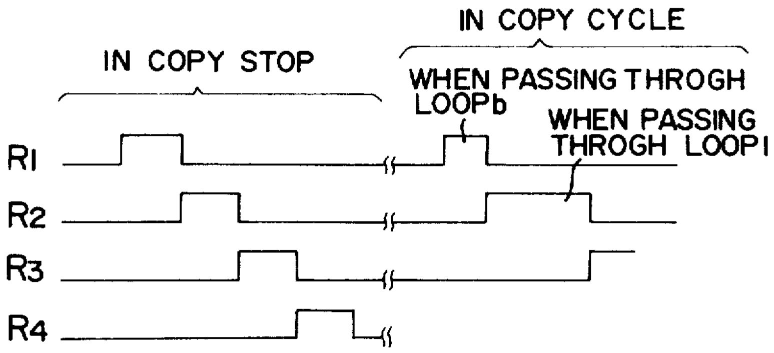
FIG. 4 is a time chart of various outputs from the control system shown in FIG. 2.
Figure 5:
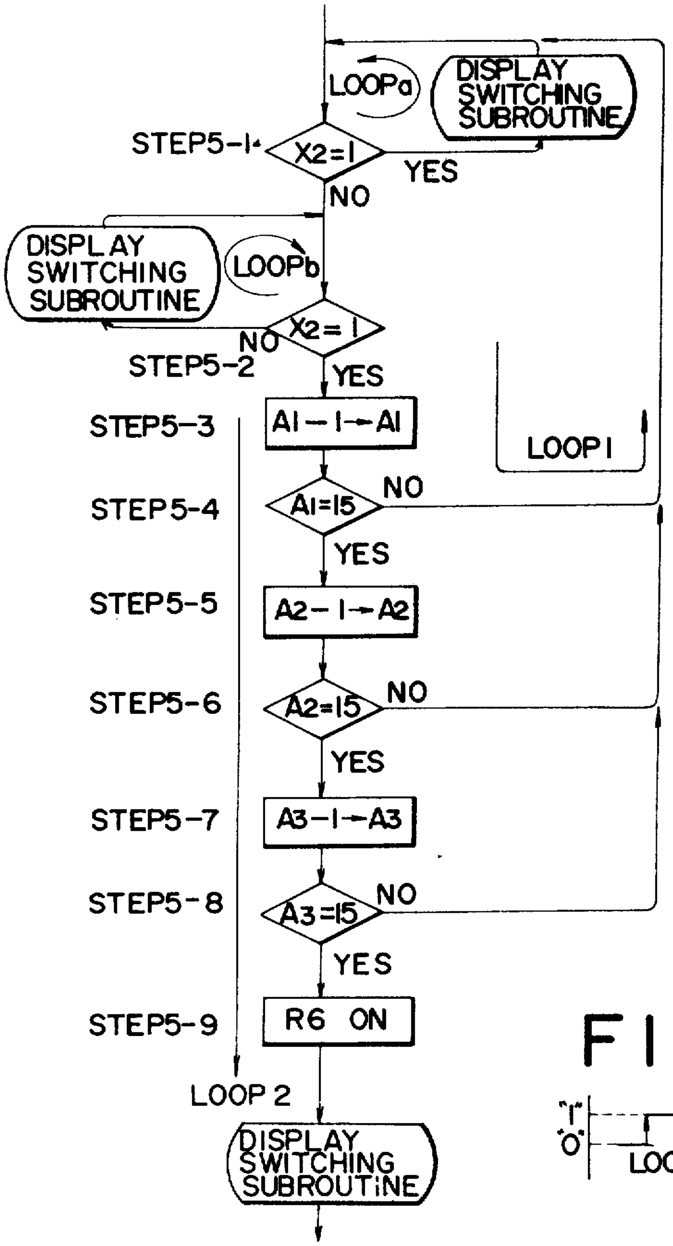
FIG. 5 is a part of a flow chart for controlling said control system.
Figure 6:
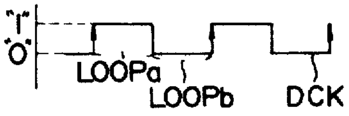
FIG. 6 is a chart showing the wave forms of the drum clock pulses.
Figure 7:
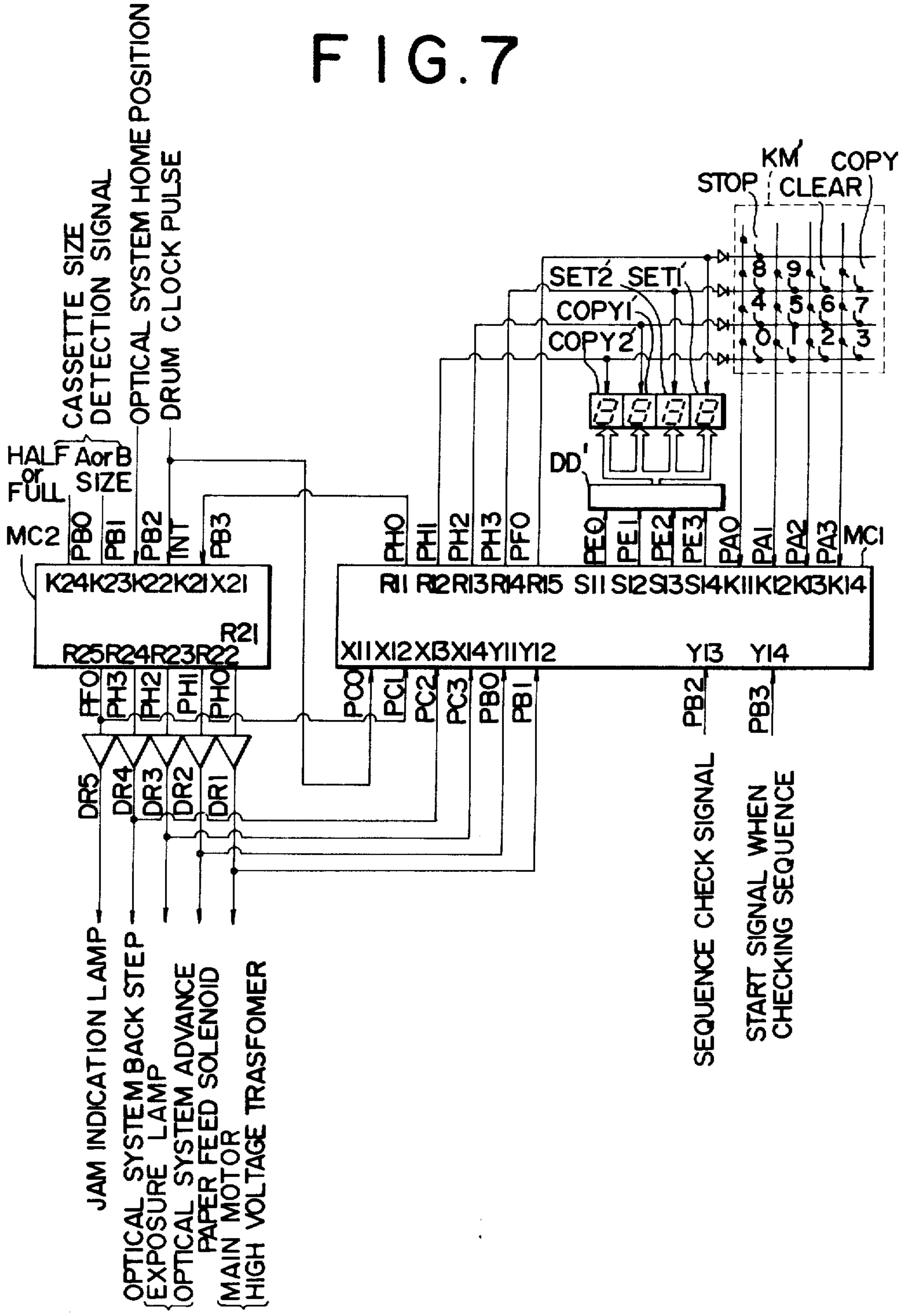
FIG. 7 is a diagram of a control system embodying the present invention.
Figure 14:
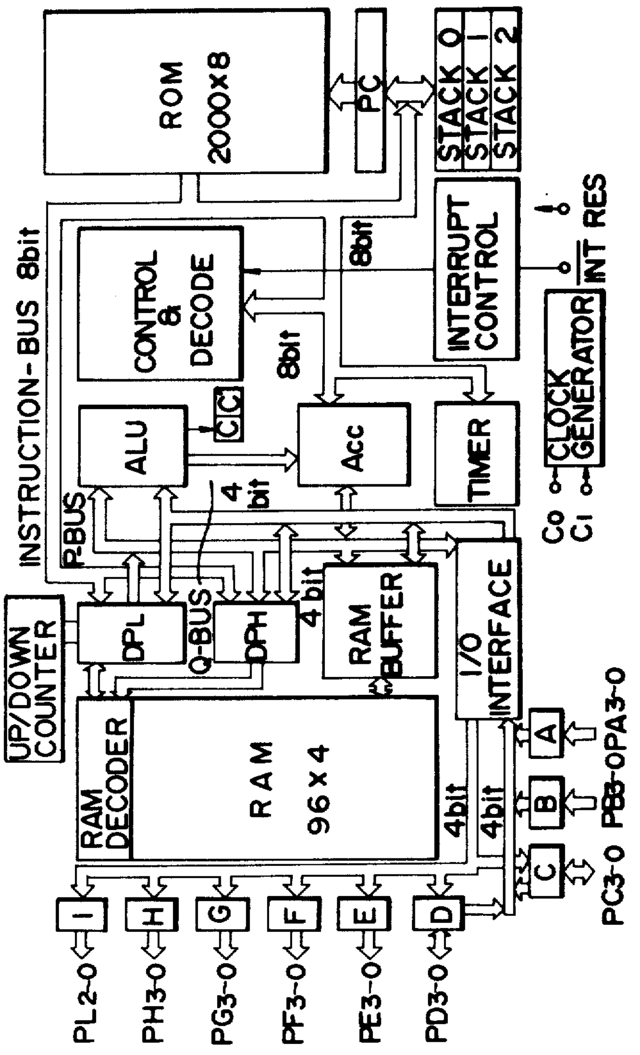
FIG. 14 is a block diagram of the interior of microcomputers MC1 and MC2.

Referring to FIG. 7 illustrating a control circuit diagram applied as a control for an electrophotographic copying apparatus, there are shown a one-chip microcomputer MC1 for real time control, a one-chip microcomputer MC2 for sequential control, said microcomputers MC1 and MC2 being both μPD546C supplied from Nippon Electric Company of which structure is shown in a block diagram in FIG. 14 and of which user's manual is attached as a reference, a key input matrix KM' similar to the matrix KM shown in FIG. 2, a display decoder DD' similar to the decoder DD shown in FIG. 2 and composed of TC5022BP supplied from Tokyo Shibaura Denki Company, display devices COPY2', COPY1', SET2' and SET1' similar to COPY2, COPY1, SET2 and SET1 shown in FIG. 2, input ports K11 to K14 respectively similar to the ports K1 to K4 shown in FIG. 2, output ports S11 to S14 respectively similar to the ports S1 to S4 shown in FIG. 2, output ports R12 to R15 respectively similar to the ports R1 to R4 shown in FIG. 2, an output port R11 for releasing instruction signals from the microcomputer MC1 to the microcomputer MC2, said signal instructing at the level "1" to initiate and maintain the copy cycle while at the level "0" to direct the cycle toward the end thereof and reset a main motor activating port R21 after the drum and optical system has returned to the home position thereof and to inhibit the copy cycle, an input X11 for the drum clock pulses DCK, an input port X12 for receiving signals from an output port R25 of the microcomputer MC2, an input port X13 for receiving signals from an output port R24 of said microcomputer MC2, an input port X14 for receiving signals from an output port R23, an input port Y11 for receiving signals from an output port R22, an input port Y12 for receiving signals from an output port R21, an input port Y14 for an external signal (hereinafter referred to as sequence check signal) for causing the microcomputer MC1 to perform checking (hereinafter referred to as sequence check) of the function of the microcomputer MC2, an input port Y14 for an external sequence check start signal for externally instructing to initiate the sequence check, an input port X21 for receiving signals from said output port R11, an input port K21 for the drum clock pulses DCK, an input port K22 for an optical system home position signal, input ports K23 and K24 for cassette size detection signals, an output port R21 for releasing a signal for activating the high-voltage transformer and the main motor through a driver circuit DR1, said signal being supplied to said input port Y12 and corresponding to the high-voltage transformer and main motor in function or out of function respectively at the level "1" or "0", an output port R22 connected to said input port Y11 to release a signal for activating the paper feed solenoid through a driver circuit DR2, an output port R23 for supplying said input port X14 with a signal for driving an optical system drive circuit through a driver circuit DR3 to advance the optical system and for lighting the exposure lamp, an output port R24 for supplying said input port X13 with a signal for driving the optical system drive circuit through a driver circuit DR4 to reverse the optical system, and an output port R25 for supplying said input port X12 with a signal for lighting the jam indication lamp through a driver circuit DR5.

In the following there will be given an explanation on the control procedure stored in a read-only memory (FIG. 14) in said microcomputer MC1, while making reference to FIGS. 8 to 10.

In the first place explained is the control program of the microcomputer MC1 while the sequence check and the copy cycle are not in function. The numbers in the squares in FIGS. 8 to 10 correspond to the step numbers to be employed later. Upon turning on of the power supply the program identifies at the step 1 if the sequence check is in progress, then proceeds, as the sequence check is not in progress in this state, to the step 2 to release the data of the second digit of copy number to the corresponding port S and sets the port R12 in the step 3 to activate the display device COPY2' for the second digit of copy number. In the step 4 there is identified the level of port Y12 to judge if the copy cycle is in process. As the copy cycle is not in progress in this state, the program proceeds to the step 5 to read the data into the ports K11, K12, K13 and K14. In the succeeding step 6 the program identifies if either one of said ports K is in the level "1", and, if so, identifies in the step 7 if the key input is already performed. If the key input is not completed, the steps 8 to 15 are conducted to store the data for the key "0", "1", "2" or "3" in an unrepresented register for the first digit of the set number. Also if the absence of key input is identified in the step 6, the program proceeds to the step 16 to reset the port R12, then reads the data for the first digit of copy number at the step 17 and set the port R13 in the step 18. The succeeding steps 19 to 30 are for reading the keys "4", "5", "6" and "7" in a similar manner as for the abovementioned steps 4 to 15. The program then resets the port R13 in the step 31, then releases the data of second digit of the set number to the port S in the step 32 and sets the port R14 in the step 33. The program then identifies, in the step 34, if the copy cycle is in progress, and, as said cycle is not in progress in this state, performs in the step 35 the data reading into the ports K. The program further identifies in the step 36 if there exist a key input, then, if so, identifies in the step 37 if the key input is already completed, and, if not, identifies the actuated key. In case it is a clear key, the data of the first and second digits of the set number and the first and second digits of the copy number stored in an unrepresented register in the microcomputer MC1 are cleared in the steps 38 and 45, while in case it is a copy key the port R11 is set in the steps 39 and 44, and in case it is a key "8" or "9" the program shifts the data in the first digit of set number to the register for the second digit thereof and stores "8" or "9" into the register for the first digit of the set number in the steps 40 to 43. Successively the program resets the port R14 in the step 46, supplies the data of the first digit of set number to the ports S in the step 47 and sets the port R15 to perform display on the display device SET1. Successively the program reads the input of a stop key in the key input matrix KM' in the step 49 and then resets the port R11 in the step 50 if the stop key is actuated, or, if the stop key is not actuated, resets the port R15 in the step 51 after repeating non-operating steps NOP twice. Successively the program identifies in the step 52 if the copy cycle is in progress, and returns to the step 2 as the copy cycle is not in progress in this state. As explained in the foregoing, the display switching process is conducted by the following repeating cycles while the copy process is not in progress and if there is no key input: step 2→step 3 (R12 reset)→step 4→step 5→step 6→step 16 (R12 reset)→step 17→step 18 (R13 reset)→step 19→step 20→step 21→step 31 (R13 reset)→step 32→step 33 (R14 reset)→step 34→step 35→step 36→step 46 (R14 reset)→step 47→step 48 (R15 reset)→step 49→step 111→step 112→step 51 (R15 reset)→step 52→step 2. The time chart in FIG. 11 shows the outputs from the output ports R12, R13, R14 and R15. As shown by the full lines therein said outputs are given at a same duty ratio so that the display devices COPY2, COPY1, SET2 and SET1 respectively corresponding to said output ports are lighted with a same duty ratio without showing any flickering.

In the following there will be explained the control procedure during a copy cycle. Upon turning on of the power supply the program identifies at the step 1 if the sequence check is in progress, then proceeds, as the sequence check is not in progress in this state, to the step 2 to release the data of the second digit of copy number to the corresponding port S and sets the port R12 in the step 3 to activate the display device COPY2' for the second digit of copy number. In the step 4 there is identified if the copy cycle is in progress. As the copy cycle is in progress in this state, the program executes non-operating steps 105 and 106, then resets the port R12 in the step 16, supplies the data of the first digit of copy number to the port S in the step 17 and sets the port R13 in the step 18. The program again identifies in the step 19 that the copy cycle is in progress, then executes the non-operating steps 107 and 108, resets the port R13 in the step 31, releases the data of second digit of the set number to the port S in the step 32 and sets the port R14 in the step 33. The program again identifies in the step 34 that the copy cycle is in progress, then executes non-operating steps 109 and 110, resets the port R14 in the step 46, supplies the data of the first digit of the set number to the port S in the step 47, sets the port R15 in the step 48, then identifies in the step 49 if the stop key is actuated, and, if so, resets the port R11 in the step 50. If the stop key is not actuated, the program repeats the non-operating steps 111 and 112, resets the port R15 in the step 51, identifies that the copy cycle is in progress in the step 52, then identifies in the step 53 if the signal to the optical system advance signal input port X14 has changed to the level "0", and returns to the step 2 if said advance signal is at the level "1". If the signal is at the level "0" the program in the step 54 adds 1 to the data of the copy counter composed of the data of the second digit of the copy number and that of the first digit thereof, then compares in the step 55 thus increased data of copy number with the data of set number composed of the data of the second digit of the set number and that of the first digit thereof, and terminates the copy cycle by resetting the port R11 if said two data are mutually equal. If they are not equal the program returns to the step 2. As explained in the foregoing the display switching process is conducted by the following repeating cycles while the copy cycle is in progress if the stop key is not actuated and if the optical system reversing signal is not entered: step 2→step 3 (set R12)→step 4→step 105→step 106→step 16 (reset R12)→step 17→step 18 (set R13)→step 19→step 107→step 108→step 31 (reset R13)→step 32→step 33 (reset R14)→step 34→step 109→step 110→step 46 (reset R14)→step 47→step 48 (set R15)→step 49→step 111→step 112→step 51 (reset R15)→step 52→step 53→step 2. The outputs from the output ports R12, R13, R14 and R15 in this case are almost identical, except for the dotted portions, with the outputs while the copy cycle is not in progress shown in the time chart of FIG. 11. Thus there is no flickering in the display as the display devices COPY2', COPY1', SET2' and SET1' corresponding to said ports R12, R13, R14 and R15 are lighted with a same duty ratio. As explained in the foregoing it is difficult to maintain a constant duty ratio in a conventional system utilizing a one-chip microcomputer since the display switching has to be conducted simultaneously with the counting of drum clock pulses DCK, but according to the present invention it is rendered possible to avoid flickering of the display during the copy cycle since the display switching is conducted by a one-chip microcomputer while the counting of said clock pulses is conducted by another microcomputer.

Furthermore, in the control apparatus of the present invention, the control signals released from the output ports R21 to R25 of the microcomputer MC2 are supplied, through the driver circuit DR1 to DR5, to the external loads and also to the input ports X13, X14, Y11 and Y12 of the microcomputer MC1 so as to enable inspection of the system relating to the microcomputer MC2. The sequence check, however, is not usually necessary and can only be conducted when externally instructed for example by a service man. The sequence check is initiated when a sequence check signal is applied to the input port Y13 and a sequence check start signal is applied to the input port Y14.

During the sequence check the key input and the indication of display are not conducted, but, only when any defect is located, the number of defective load and the number of defective timing are respectively indicated on the display devices COPY1' and COPY2' for the copy number and on the display devices SET1' and SET2' for the set copy number to facilitate the operation of service men.

Also it is rendered possible to detect and indicate the presence of eccentricity in the drum or of abnormality in the drum clock pulses DCK by measuring the duration of said pulse.

Figure 10A:
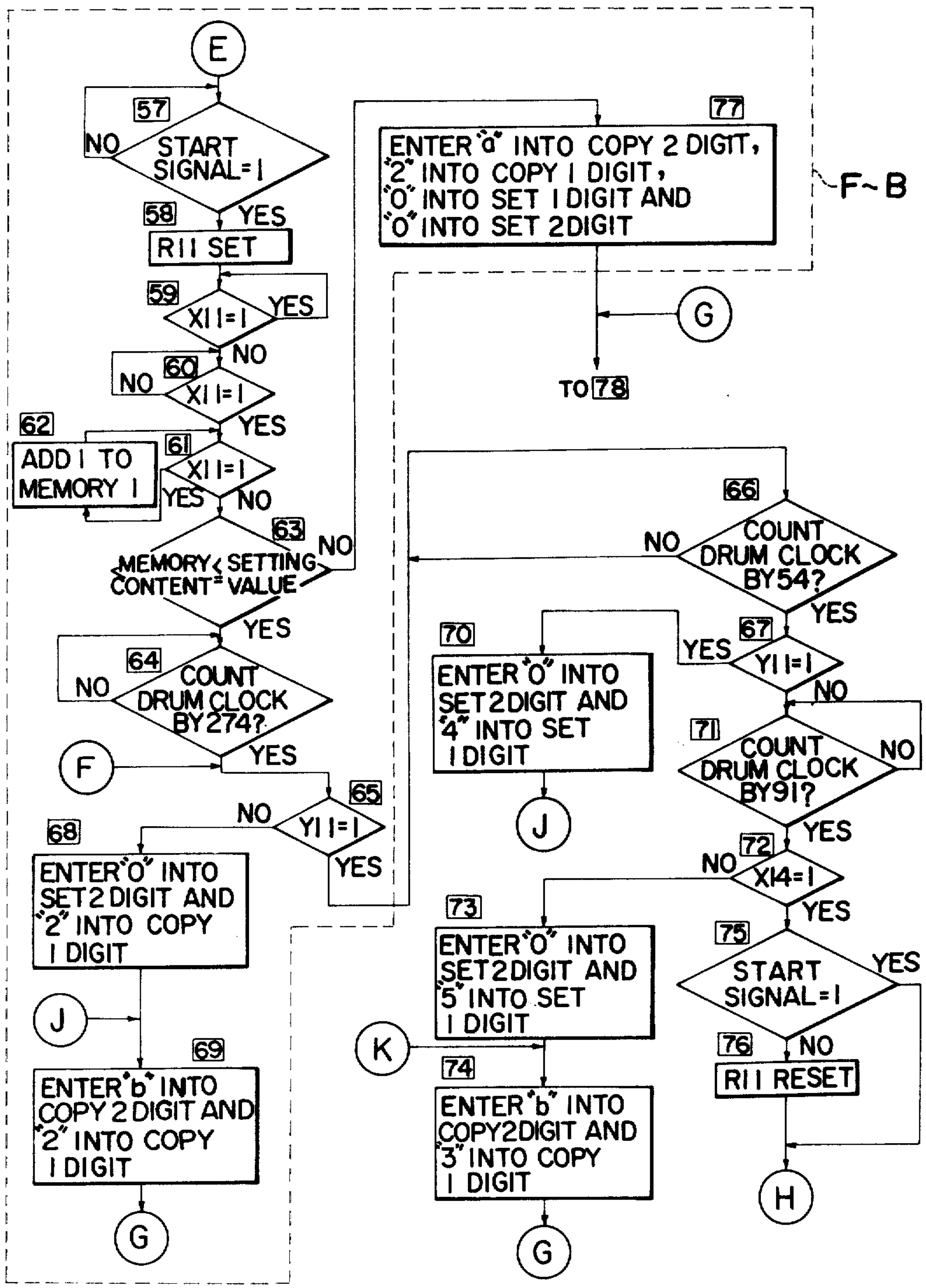
Figure 10B:
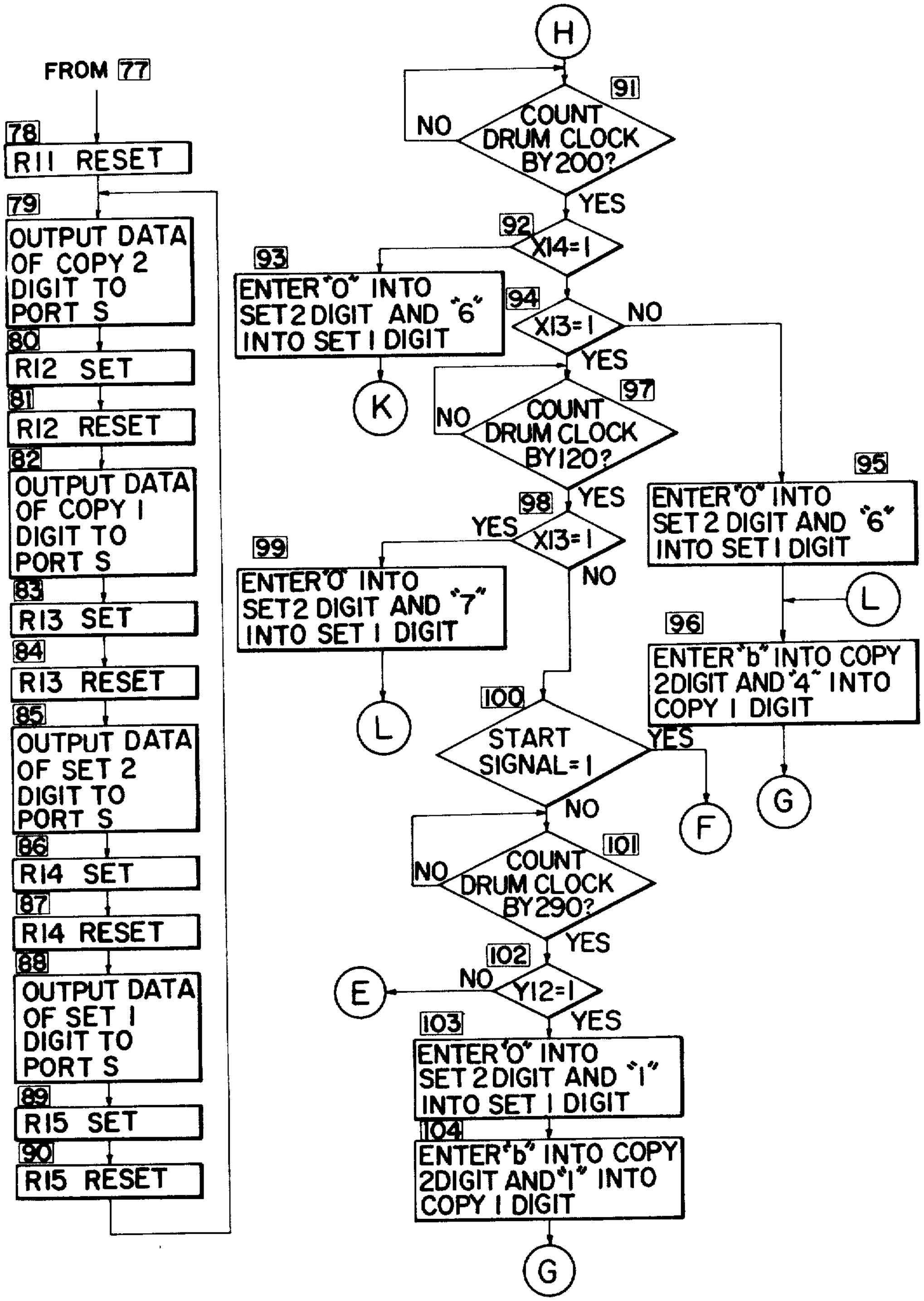
Figure 11:
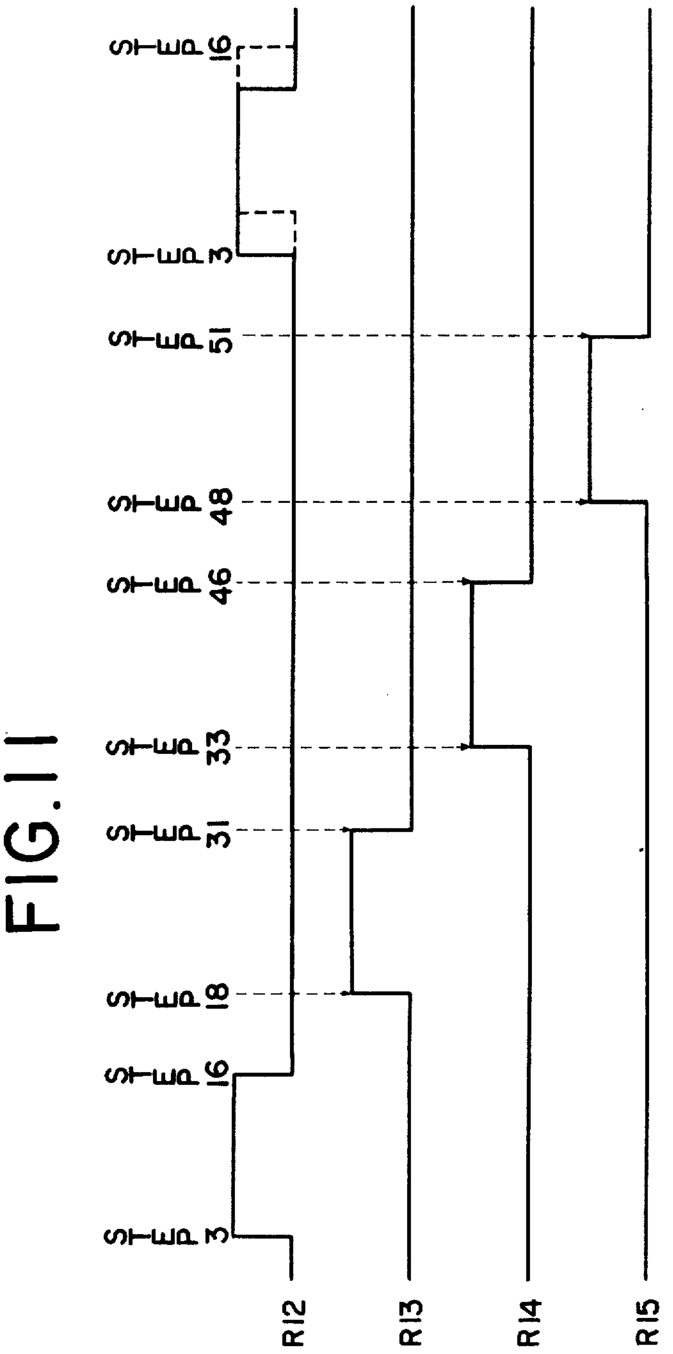
FIG. 11 is a time chart showing the display output signals while the copy cycle is out of operation and in operation.
Figure 12:
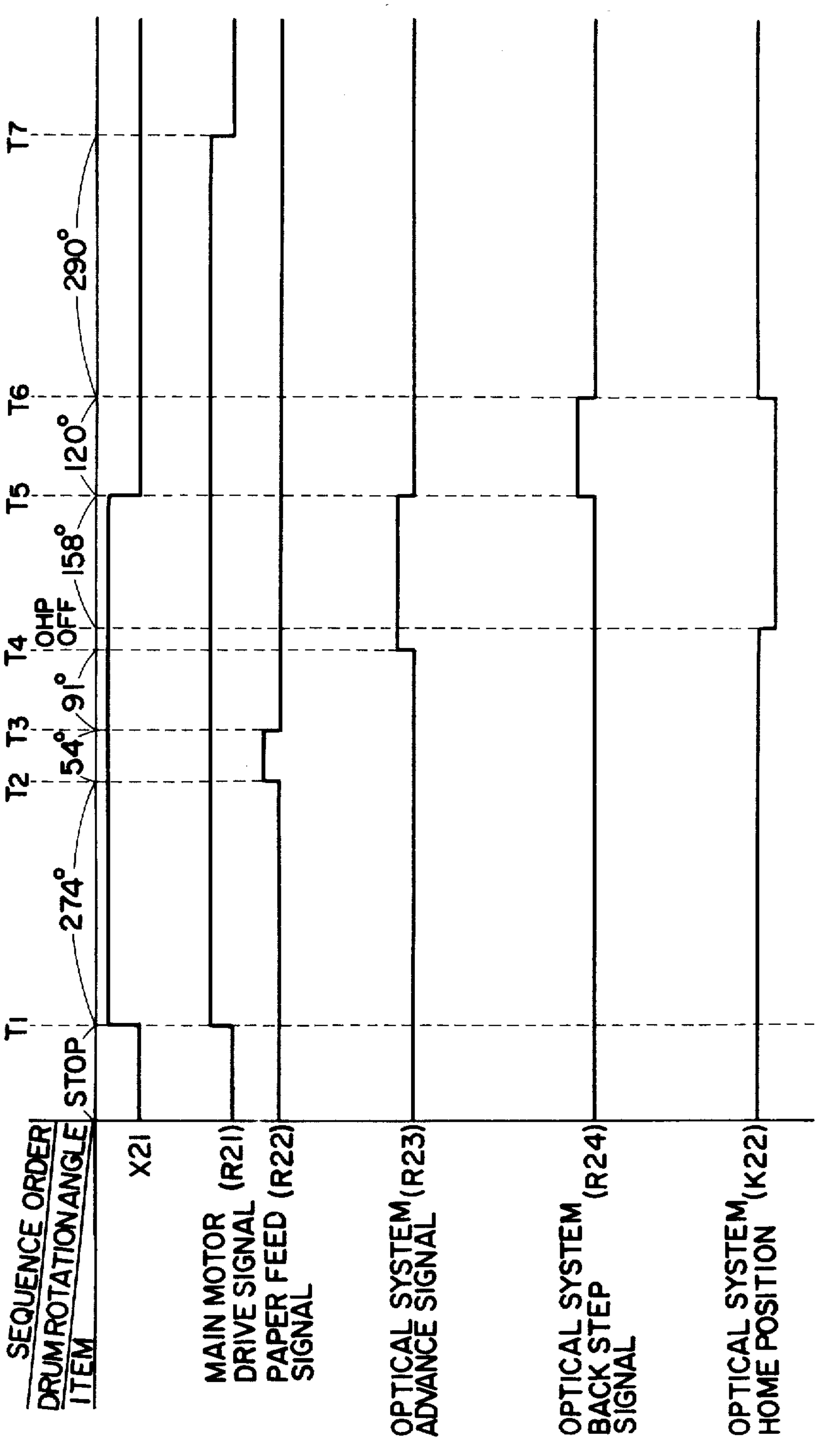
FIG. 12 is a time chart showing output signals from a microcomputer MC2 shown in FIG. 7.

In the following explained is the function in the sequence check, making reference to FIG. 10 showing the control procedure stored in an unrepresented memory in the microcomputer MC1 and FIG. 12 showing a timing chart of the microcomputer MC2. In the following it is assumed that the number of drum clock pulses coincides with the angle, in degrees, of the drum rotation. When the power supply is turned on after the entry of a sequence check signal to the port Y13, the program proceeds from the step 1 to the step 57, in which the program awaits the entry of a sequence check start signal, and, upon receipt thereof, proceeds to the step 58 to set the port R11 thereby transmitting a copy start signal to the microcomputer MC2. The program detects in the steps 59 and 60 the leading end of the signal to the drum clock reading port X11, and, in the steps 61 and 62, counts the number of repeating the loop formed by said steps in order to measure the duration of the level "1" of the drum clock pulse, said number being stored in an unrepresented memory 1 in the microcomputer MC1. At the trailing end of the drum clock pulse the program proceeds to the step 63 in which said number of repeating stored in the memory 1 is compared with a preset number indicating the standard duration of the level "1" of the drum clock pulse, and proceeds to the step 77 if said counted number is less than said preset number, i.e. if the drum clock frequency is abnormal. In the step 77 "a", "2" and "0" are respectively entered into the register for the second digit of the copy number, the register for the first digit of the copy number, and the registers for the first and second digits of the set number. Successively the program resets the port R11 in the step 78 to interrupt the copy cycle, then sets and resets the output ports R12, R13, R14 and R15 in succession in the steps 79 to 90 to indicate "A", "2", "0" and "0" respectively on the display devices SET2', SET1', COPY2' and COPY1'. In this manner it is possible to show the abnormality in the drum clock frequency for example to a service man.

Though in the foregoing explanation the detection is made only on the abnormality in the drum clock frequency, it is also possible, even if there is no abnormality in the output control signals from the microcomputer MC2 such as the paper feed solenoid signal or the optical system advance signal to be explained later, to detect if the paper feed solenoid or the optical system itself is functioning properly and indicate any abnormality therein on the aforementioned display devices in a similar manner as for the above-mentioned abnormality in the drum clock frequency. Thus the copying apparatus of the present embodiment is provided with a control unit for checking the function state of various parts of the copying apparatus.

In the absence of abnormality in the drum clock frequency, the program proceeds from the step 63 to the step 64 for counting 274 drum clock pulses corresponding to a rotation of 274° of the drum, and identifies, in the step 65, if the paper feed solenoid signal input port Y11 is in the level "1", i.e. if the paper feed signal is supplied at the paper feed start timing T2. If the port Y11 is not in the level "1", "0" and "2" are respectively entered at the step 68 into the register for the second digit of the set number and that for the first digit thereof, and "b" and "2" are entered in the step 69 respectively into the register for the second digit of the copy number and that for the first digit thereof. Successively the program proceeds to the step 78 to reset the port R11 thereby terminating the copy cycle and repeating a loop composed of the steps 79 to 90 for displaying "b", "2", "0" and "2" respectively on the aforementioned display devices, thus indicating the presence of an abnormality in the paper feed solenoid signal at the paper feed start timing.

In the absence of abnormality in the paper feed solenoid signal at the paper feed start timing, the program counts 54 drum clock pulses in the step 66 and again identifies if the aforementioned port Y11 is in the level "1", i.e. if the paper feed solenoid signal is supplied at the paper feed end timing T3. If the port Y11 is still at the level "1" in this state, the program enters "0" and "4" in the step 76 respectively into the registers for the second digit and the first digit of the set number, then enters "b" and "2" in the step 69 respectively into the registers for the second digit and the first digit of the copy number, and terminates the copy cycle in the step 78 to repeat a loop composed of the steps 79 to 90 for displaying "b", "2", "0" and "4" on said display devices, thus indicating the presence of an abnormality in the paper feed solenoid signal at the paper feed end timing.

In the absence of abnormality in the paper feed solenoid signal, the program counts 91 drum clock pulses in the step 71 and identifies in the step 72 if the optical system advance signal input port X14 is at the level "1", i.e. if the optical system advance signal is released at the optical system advance starting timing. If said port X14 is not at the level "1" in this state, the program enters "0" and "5" in the step 73 respectively into the registers for the second digit and the first digit of the set number, then enters "b" and "3" in the step 74 respectively into the registers for the second digit and the first digit of the copy number, and then executes the steps 78 to 90 to display "b", "3", "0" and "5" respectively on the aforementioned display devices, thus indicating the presence of an abnormality in the optical system advance signal at the optical system advance start timing.

In the absence of abnormality in said optical system advance signal at the optical system advance start timing T4, the program proceeds to the step 75 to identify if the aforementioned sequence check signal is at the level "1", and continues the sequence check if said signal is at the level "1". If it is at the level "0", the port R11 is reset to interrupt the copy cycle, the program proceeds to the step 91 for counting 200 drum clock pulses corresponding to a drum rotation of 200°, and identifies in the step 92 if said advance signal input port X14 is at the level "1", i.e. if the voltage level of the optical system advance signal is equal to zero at the timing T5. If said port X14 is at the level "1", the program enters "0" and "6" in the step 93 respectively into the registers for the second digit and the first digit of the set number, then enters "b" and "3" in the step 74 respectively into the registers for the second digit and the first digit of the copy number, and then executes the steps 78 to 90 for displaying "b", "3", "0" and "6" on the aforementioned display devices, thus indicating the presence of an abnormality in the optical system advance signal at the optical system reversing timing.

In the absence of abnormality in the optical system advance signal, the program identifies in the step 94 if the optical system back step signal input port X13 is at the level "1", i.e. if the optical system back step signal is at the voltage level "1" at the timing T5. If said port X13 is not at the level "1", the program enters "0" and "6" in the step 95 respectively into the registers for the second digit and the first digit of the set number, then enters "b" and "4" in the step 96 respectively into the registers for the second digit and the first digit of the copy number, then resets the port R11 in the step 78 to direct the copy cycle toward ending, and executes the steps 79 to 90 for displaying "b", "4", "0" and "6" on the aforementioned display devices, thus indicating the presence of an abnormality in the optical system back step signal at the optical system reversing timing.

In the absence of abnormality in the optical system back step signal at the optical system reversing timing, the program counts 120 drum clock pulses in the step 97, and again identifies the voltage level of said port X13 in the step 98, i.e. if the optical system back step signal at the voltage level "0" at the timing T6 shown in the time chart of FIG. 11. If said port X13 at the level "1", the program enters "0" and "7" at the step 99 respectively into the registers for the second digit and the first digit of the set number, then enters "b" and "4" in the step 96 respectively into the registers for the second digit and the first digit of the copy number, then resets the port R11 in the step 78 to direct the copy cycle toward the ending and executes the steps 79 to 90 for displaying "b", "4", "0" and "7" on the aforementioned display devices, thus indicating the presence of an abnormality in the optical system back step signal at the end timing of the reciprocating motion of the optical system.

In the absence of the optical system back step signal, the program identifies in the step 100 if the sequence check start signal is at the voltage level "1", and, if so, returns to the step 65 to conduct sequence check by repeating the copy cycle.

If said start signal is at the voltage signal "0", the program counts 290 drum clock pulses in the step 101 and then identifies if the input port Y12 for the drive signal for the main motor and high-voltage transformer is at the level "1" at the timing T7 shown in the time chart of FIG. 12, i.e. if said drive signal is terminated at said timing T7. If said port Y12 is at the level "1", the program enters "0" and "1" in the step 104 respectively into the registers for the second digit and the first digit of the set number, then enters "b" and "1" in the step 104 respectively into the registers for the second digit and the first digit of the copy number, then resets the port R11 in the step 78 to direct the copy cycle toward the ending, and executes the steps 79 to 90 for displaying "b", "1", "0" and "1" on the aforementioned display devices, thus indicating the presence of an abnormality in the drive signal for the main motor and high-voltage transformer at the copy cycle end timing. On the other hand if the port Y12 is at the level "0", signifying that all the factors are in proper conditions, the program returns to the step 57 and awaits the entry of the aforementioned start signal.

As explained in the foregoing it is not only possible, according to the present invention, to eliminate flickering in the display during the copy cycle, but also to inspect the functioning state of various portions such as of the drum clock frequency to inspect the state of various control signals and to indicate the presence of abnormal signal, the location of abnormality or the presence of an abnormal timing on the display devices, wherein the location of abnormality and the state thereof can be dividedly indicated on the display devices for the set number and those for the copy number.

Figure 8:
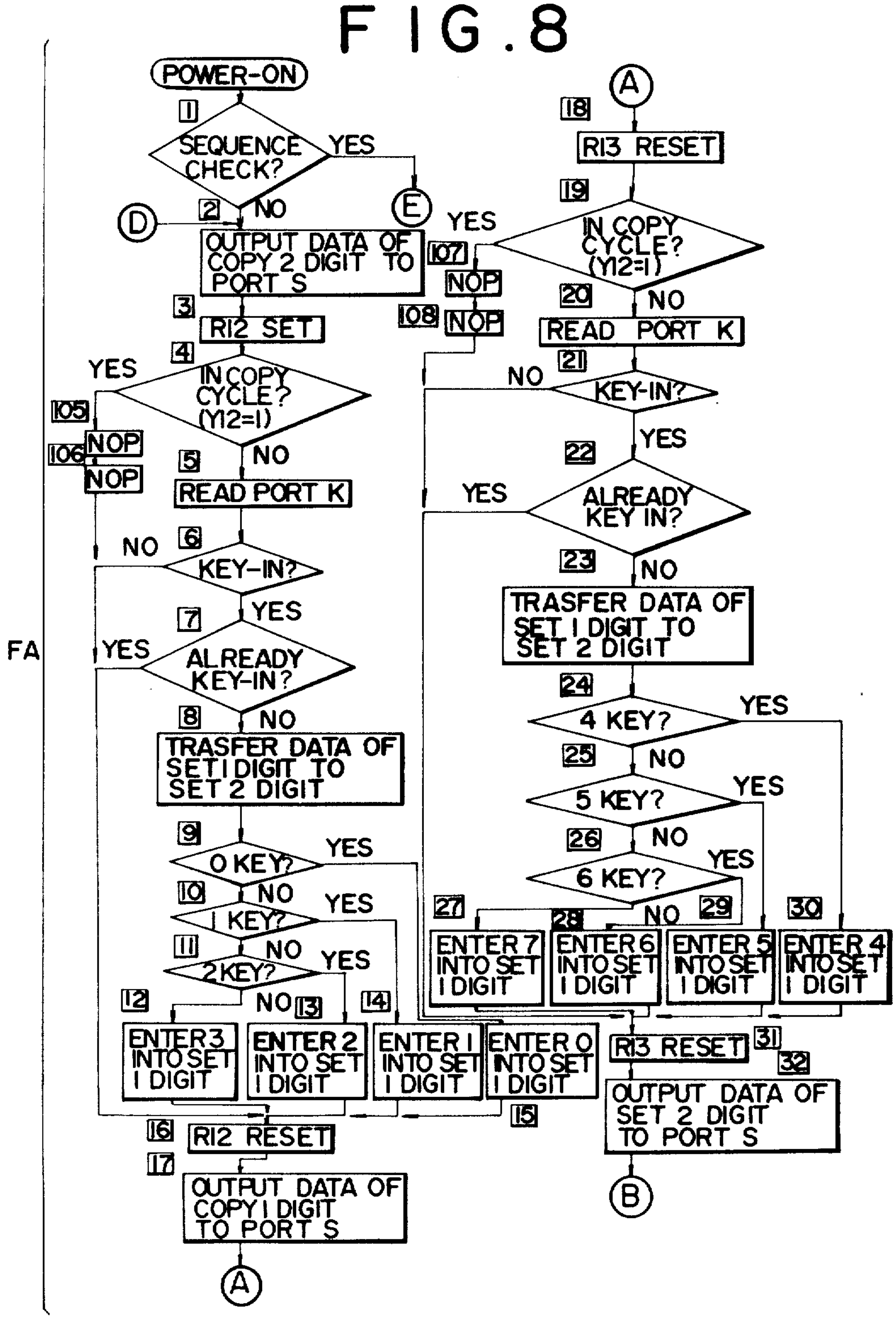
FIGS. 8 to 10A and B are flow charts of a control program in a microcomputer MC1 shown in FIG. 7.
Figure 9:
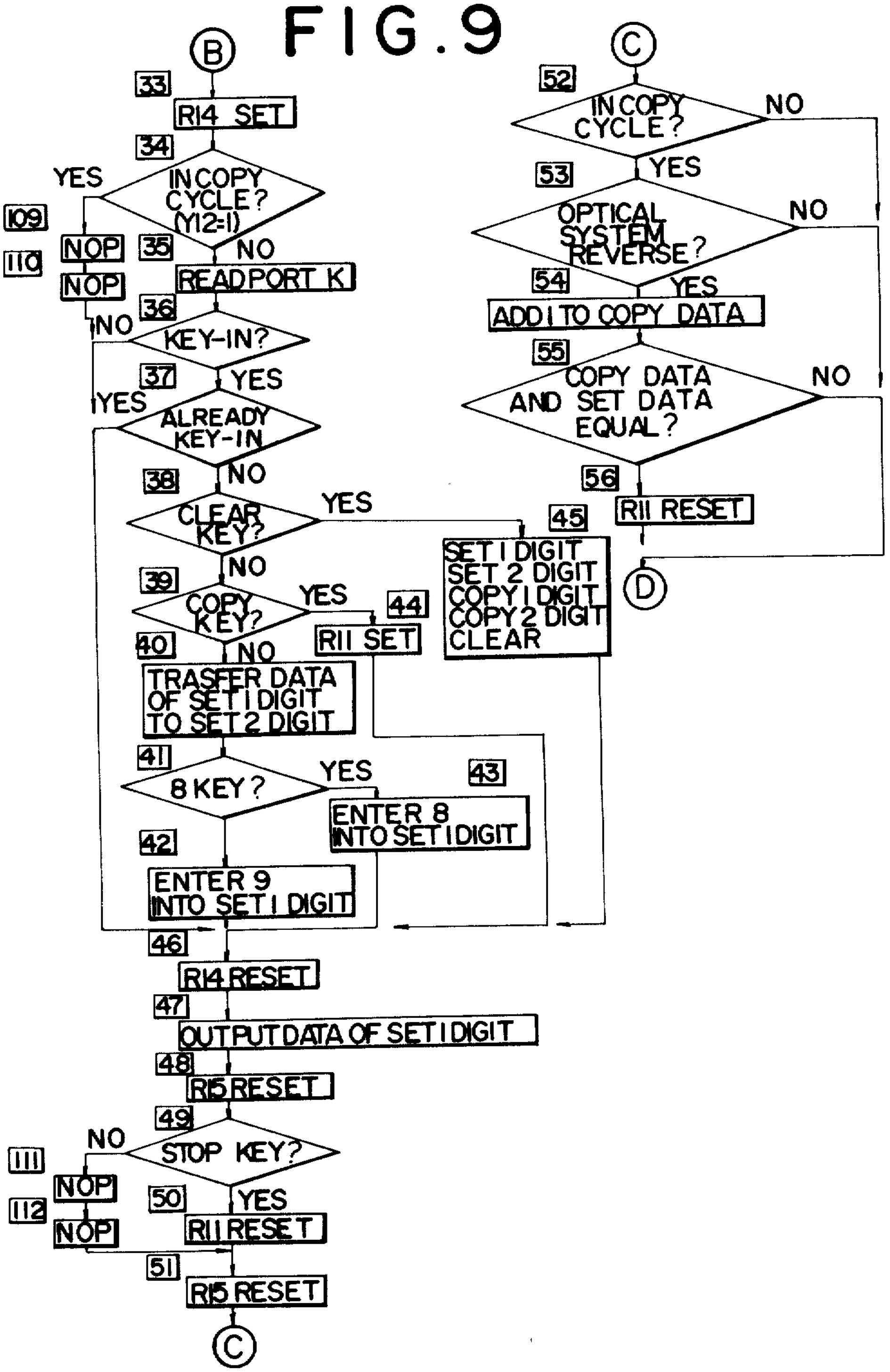
Figure 13A:
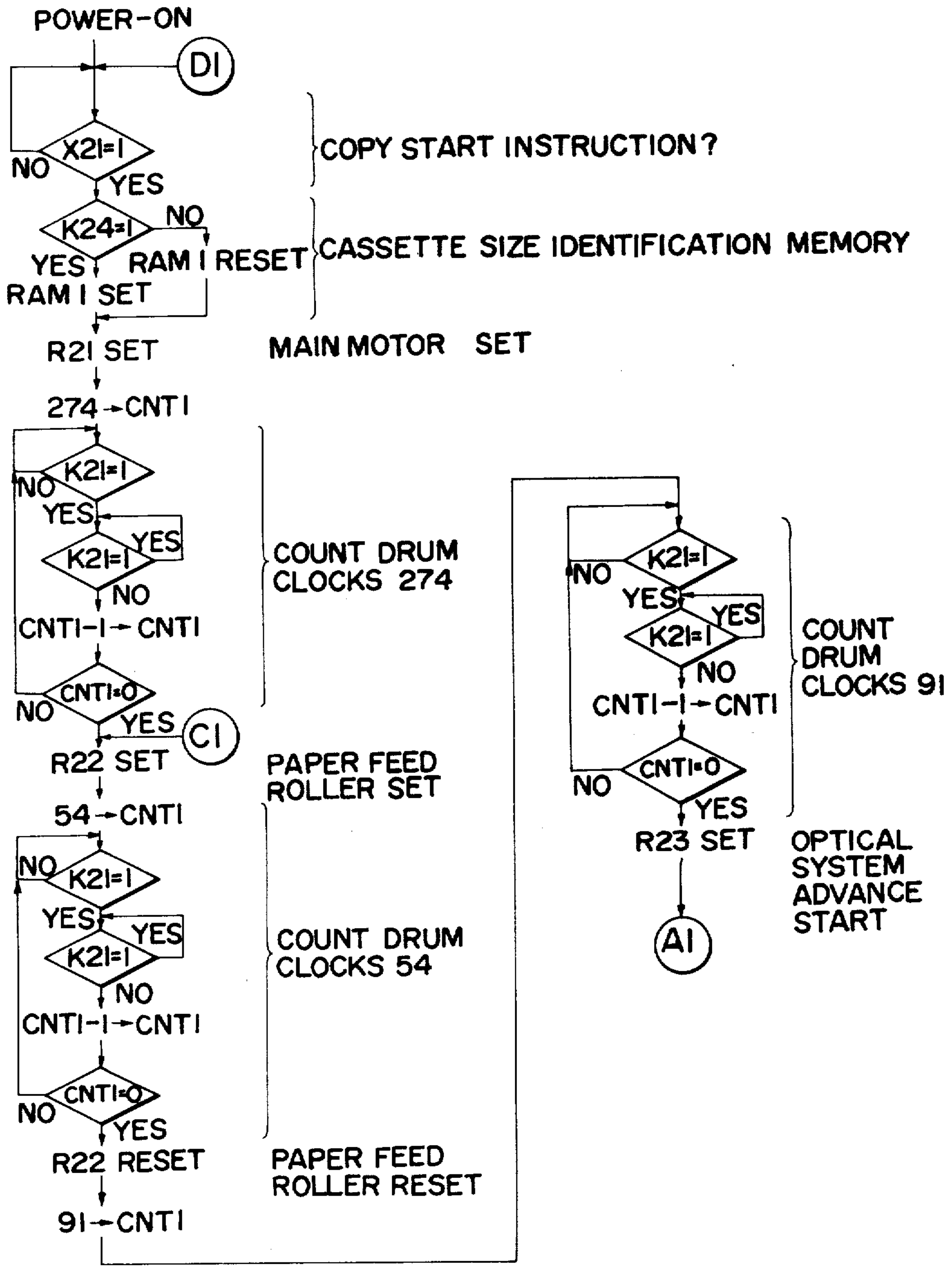
FIGS. 13A and 13B is a flow chart of a control program in said microcomputer MC2 shown in FIG. 7.
Figure 13B:
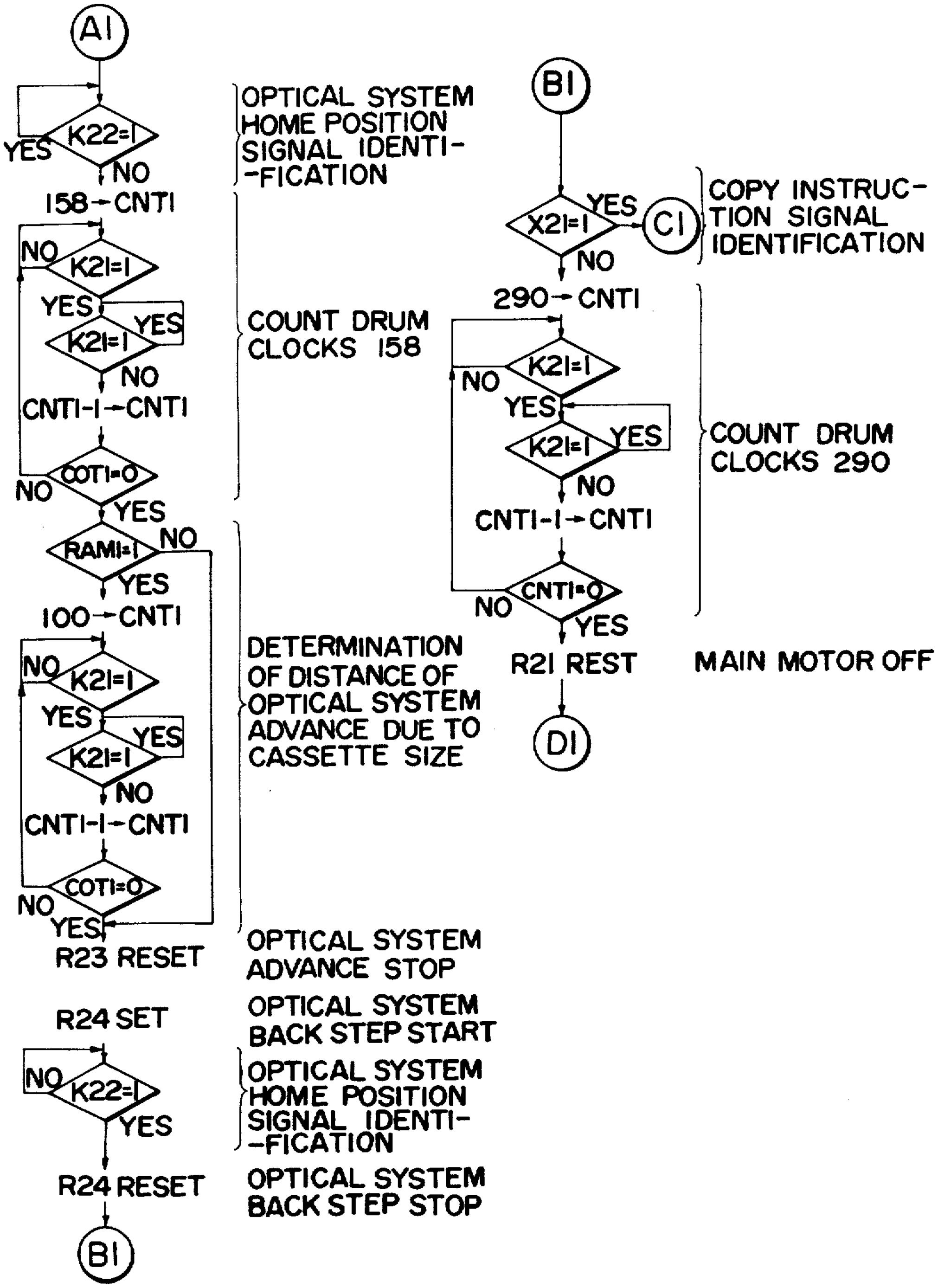
Figure 15A:
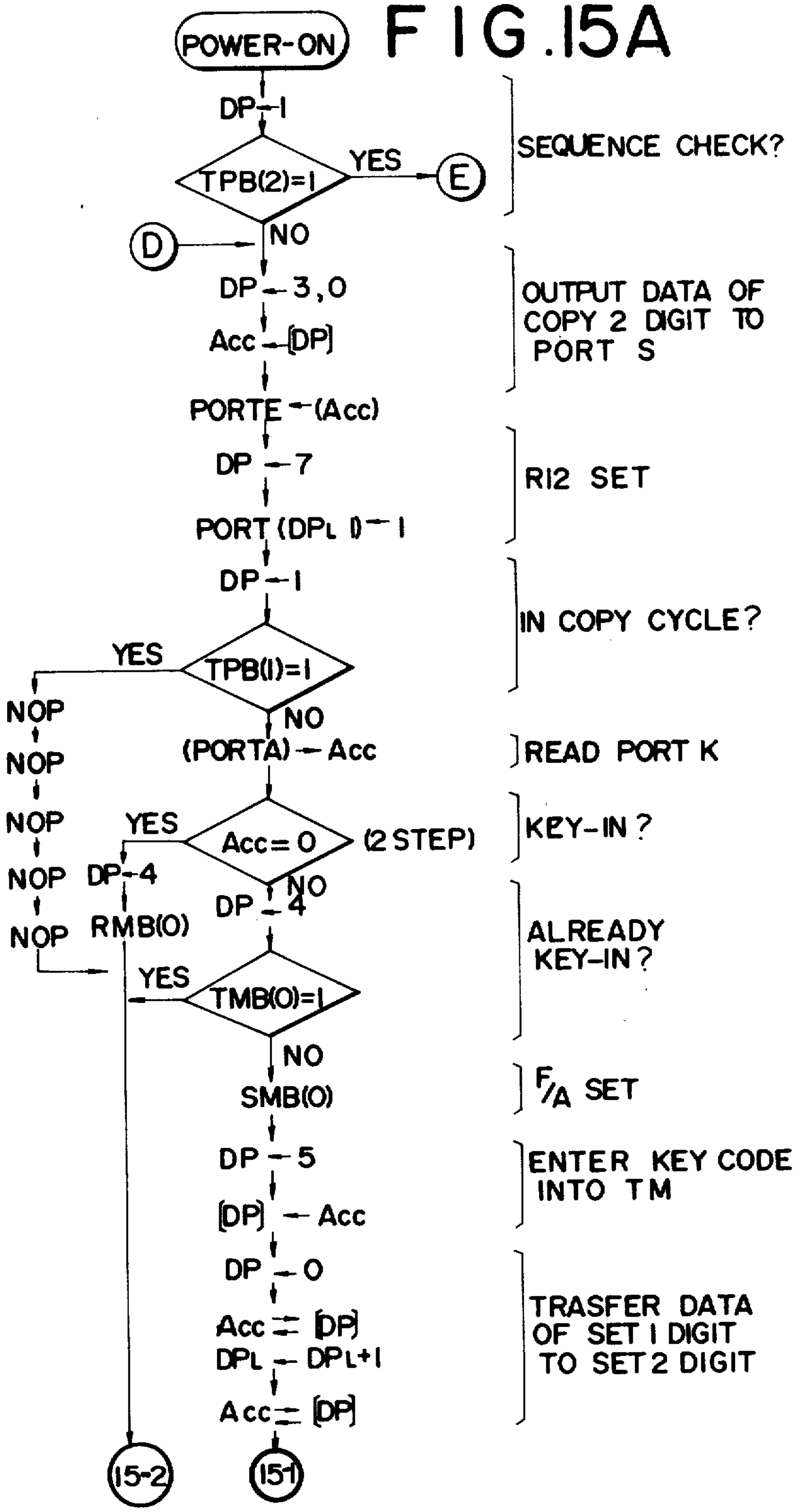
FIGS. 15A and 15B is a detailed flow chart constituting a part of the flow chart shown in FIG. 8.
Figure 15B:
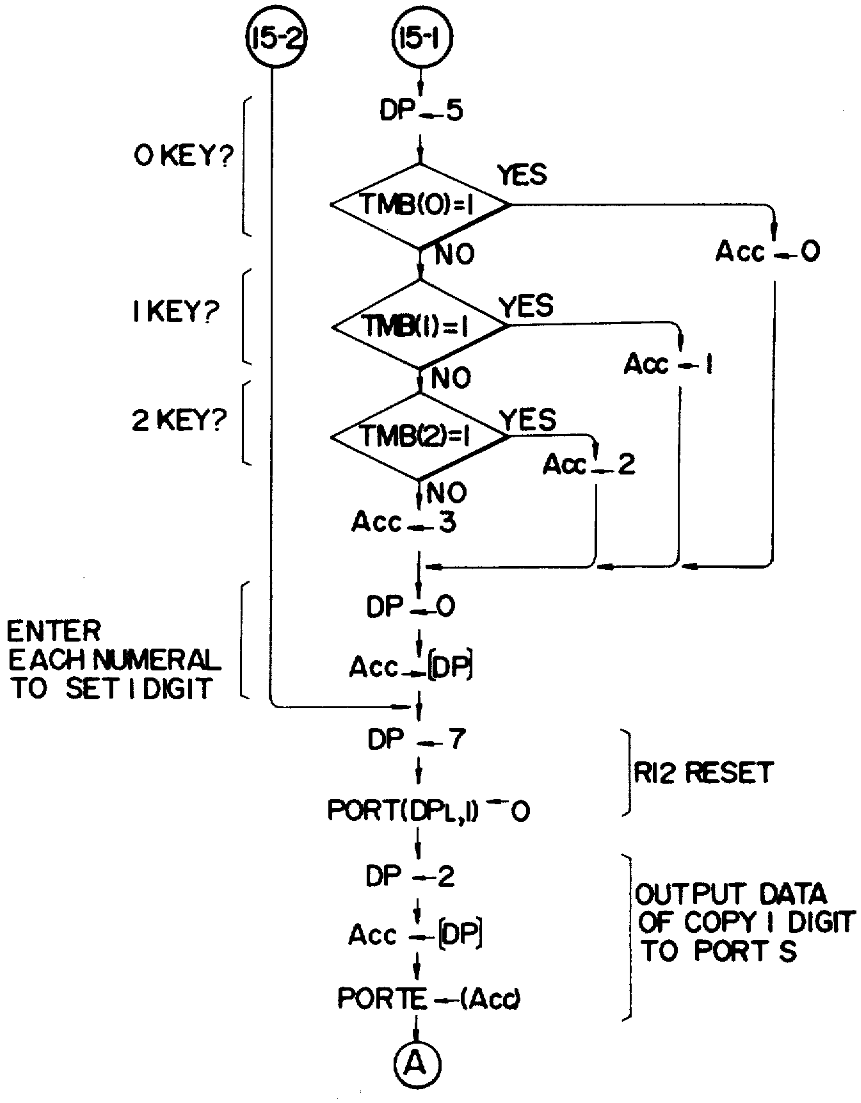
Figure 16A:
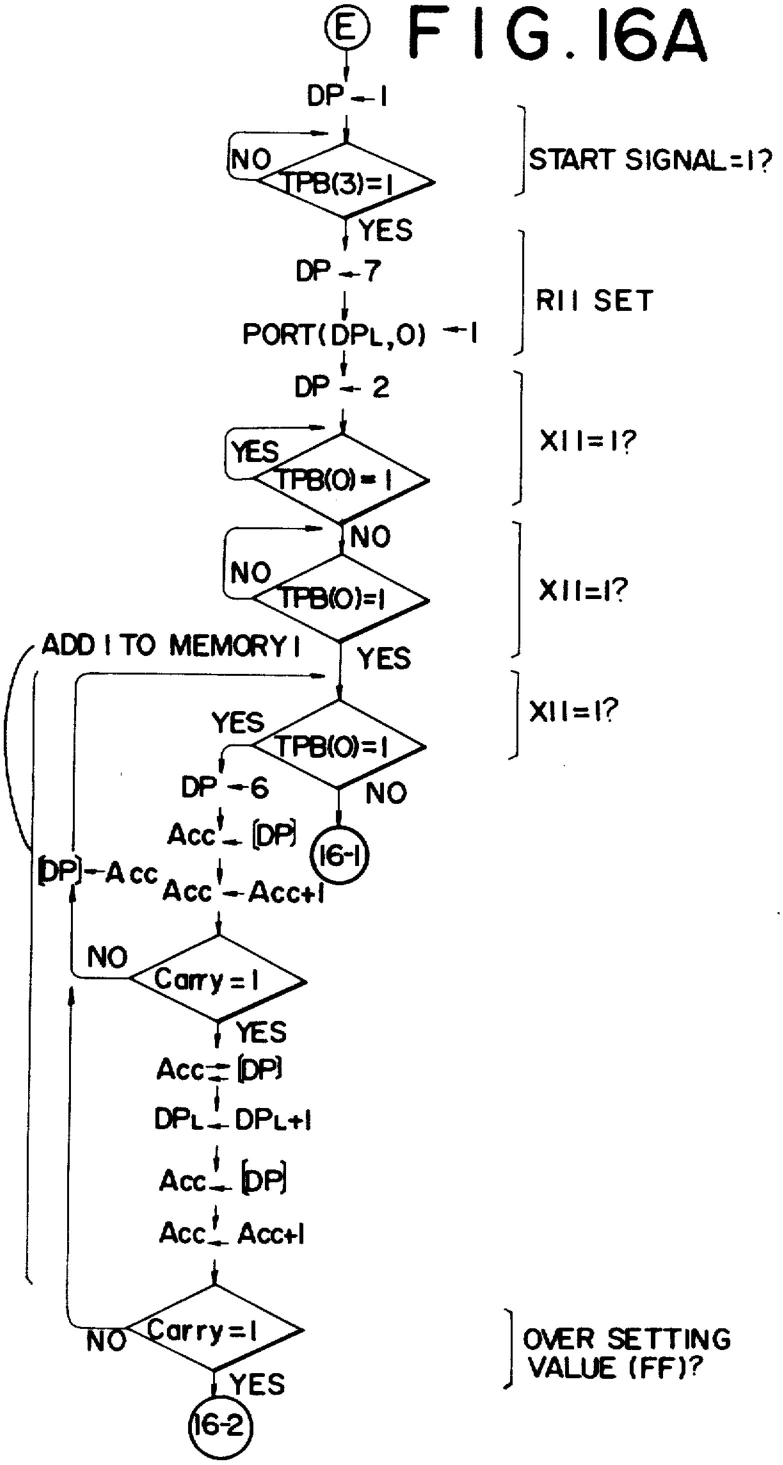
FIGS. 16A–16D is a detailed flow chart constituting a part of the flow chart shown in FIG. 10.
Figure 16B:
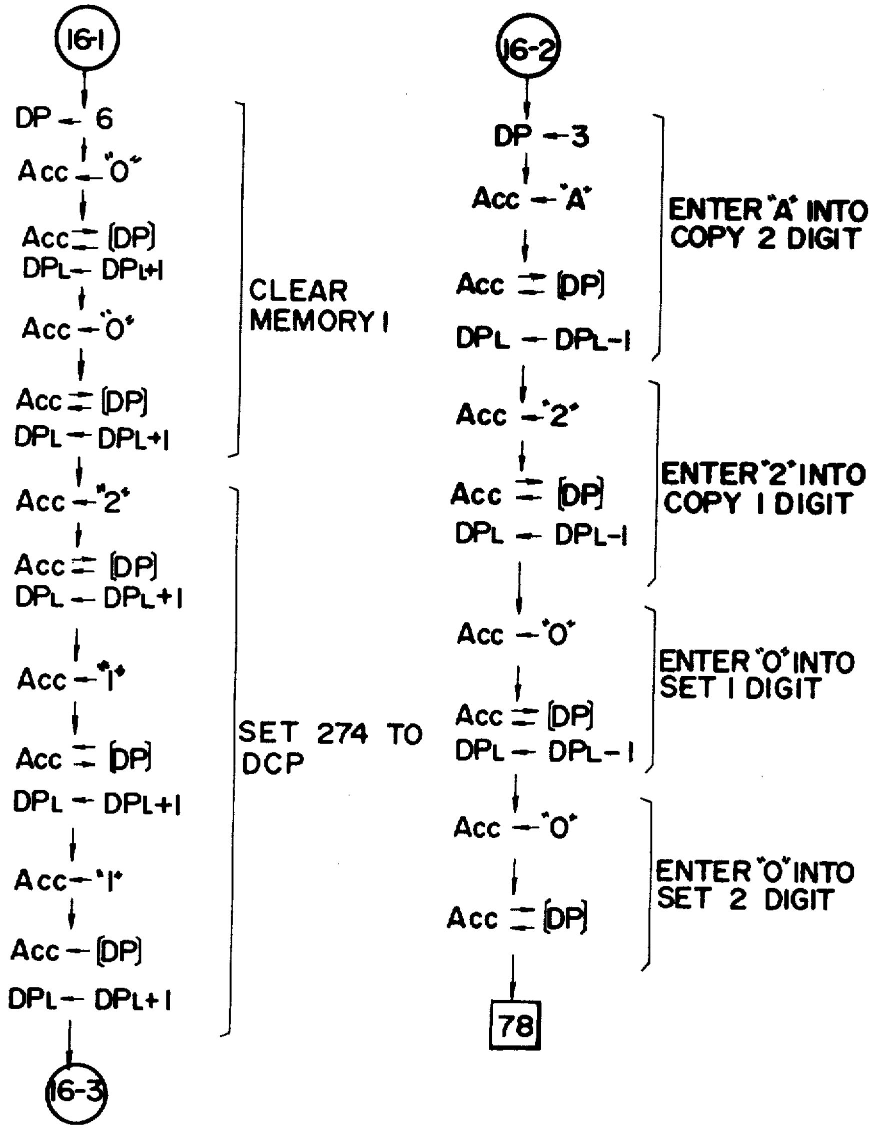
Figure 16C:
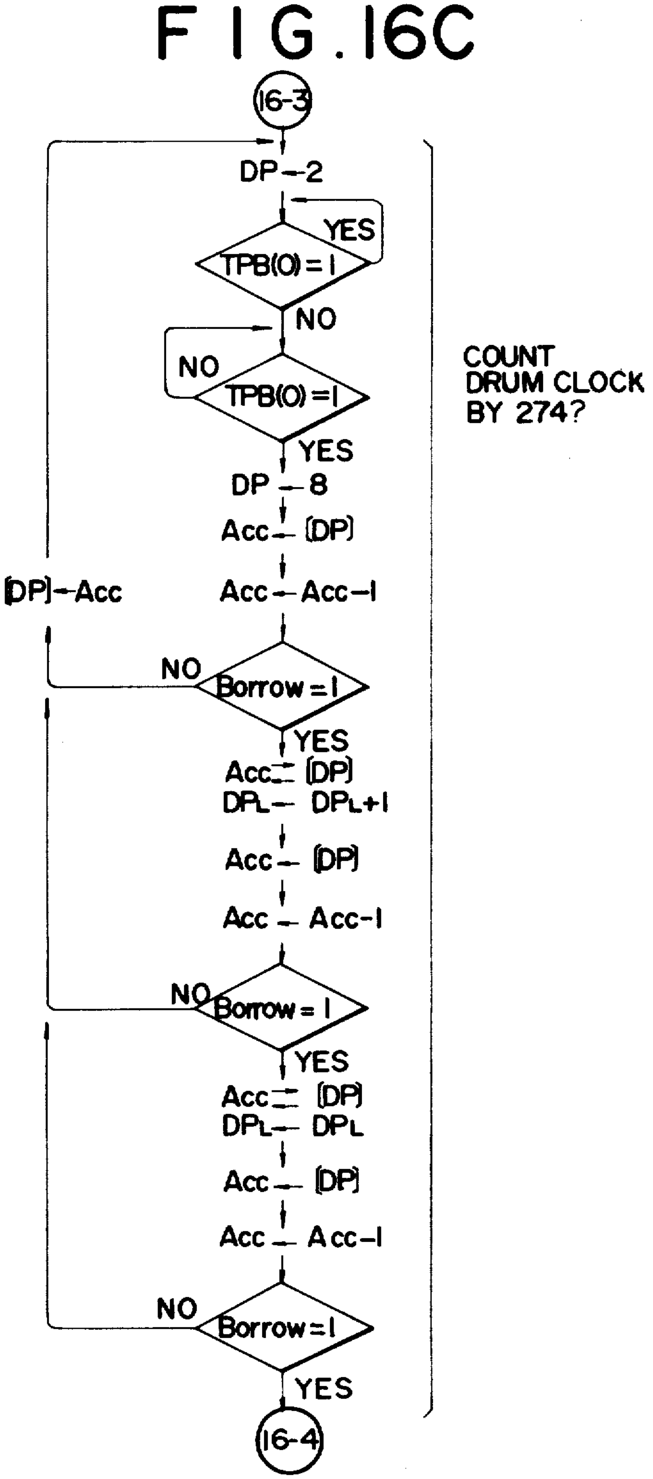
Figure 16D:
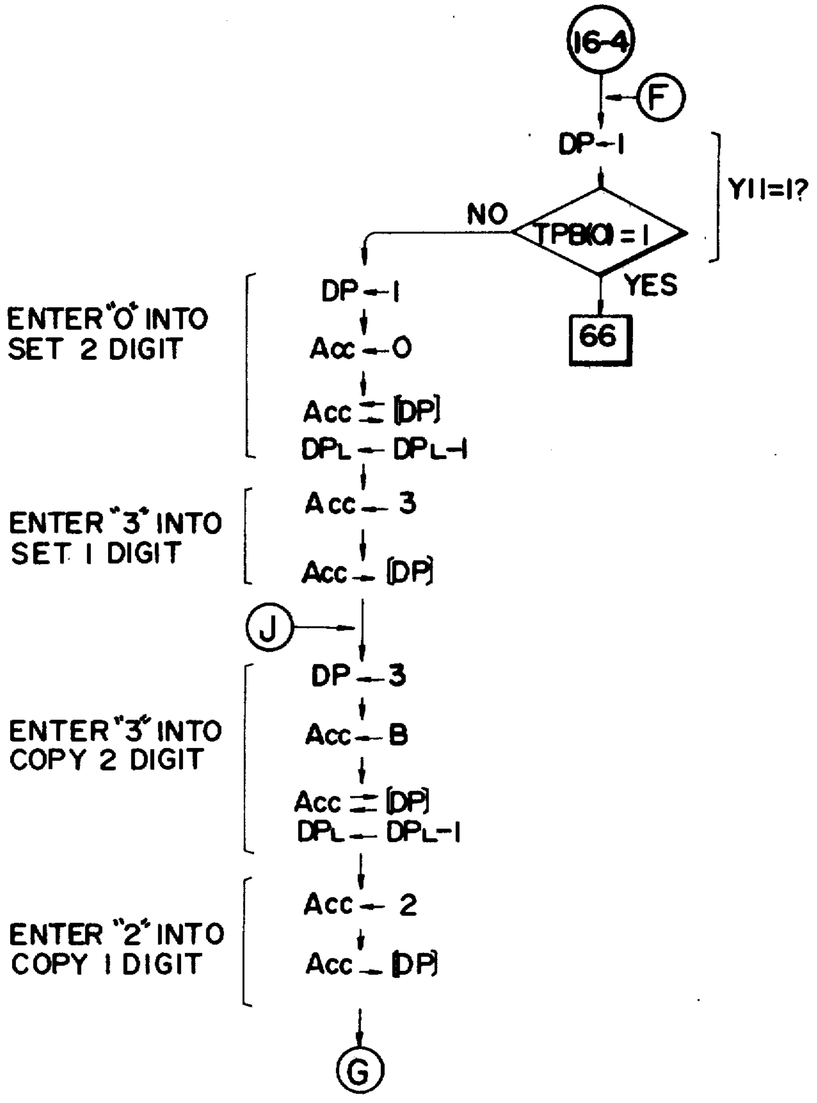
Figure 17:
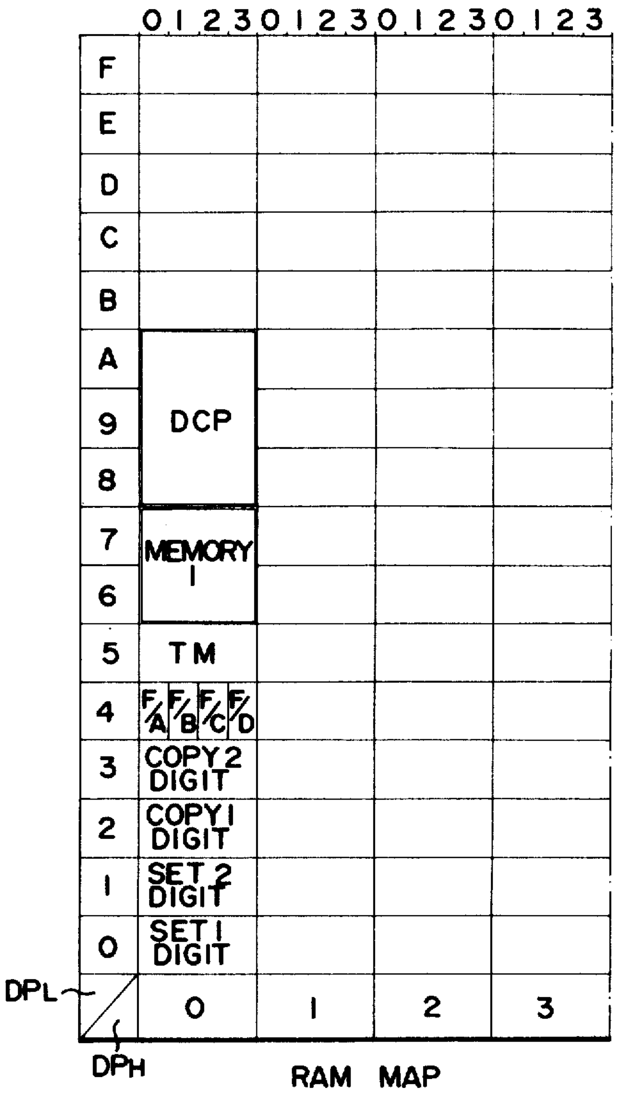
FIG. 17 is a random access memory map contained in the microcomputer MC1.

The control program flow chart of the microcomputer MC2 is shown in FIG. 13, while FIG. 15 and FIG. 16 respectively show detailed flow charts of the portion F-A in FIG. 8 and portion F-B in FIG. 10, and FIG. 17 shows a random-access memory map in the microcomputer MC1.

According to the present invention it is rendered possible, by employing a control unit for information input and dynamic display and a separate control unit for sequential control of the relevant devices, in an apparatus involving many control loads and many input information such as a copier, to eliminate flickering in the display and also to avoid shortage of number of input and/or output ports encountered when a single one-chip microcomputer is employed as the control unit, thus enabling to conduct all the control functions with the microcomputers, allowing to significantly improve the reliability of the apparatus and further enabling to provide the control unit with the additional functions by the remaining ports.

Furthermore the present invention is also applicable to the image forming apparatus provided with additional devices such as an automatic original feeding unit or a transfer sheet handling device for collating transfer sheets. It can be achieved by providing the image forming apparatus with a control unit provided with a program memory, by providing additional devices with control units respectively provided with program memories and rendering the control unit of the image forming apparatus to inspect and control the functions of the control units of said additional devices.

Also it is to be understood that the present invention is not limited to the foregoing embodiment but is subject to modifications within the scope and spirit of the appended claims.

What we claim is:

1. An image forming apparatus comprising:

image forming means having a plurality of process executing means for executing an image forming process;

a plurality of input means for entering data needed for execution of said image forming process by said image forming means;

first control means having a first storage means for storing a first program to read out the data entered from one of said input means and to control said process executing means; and second control means having a second storage means for storing a second program to read out the data entered from another of said input means, said second control means controlling said first control means to operate said process executing means in accordance with the data entered from said input means.

2. An image forming apparatus according to claim 1, wherein said second control means receives the control signal from said first control means to said image forming means, and controls said first control means by said control signal and said data entered from said input means.

3. An image forming apparatus according to claim 2, wherein said input means has numerical keys for entering the number of image forming operations, and said second control means controls said first control means so that said image forming means executes the image forming operation the number of times entered from said numerical keys.

4. An image forming apparatus according to claim 3, wherein said second control means has counting means for counting the number of image forming operations of said image forming means.

5. An image forming apparatus according to claim 4, further comprising display means for displaying the content of said counting means, said display means being controlled by said second control means.

6. An image forming apparatus comprising:

image forming means having a plurality of process executing means for executing an image forming process;

first control means having a first storage means for storing a first program to control said process executing means;

display means for displaying data relating to the image forming by said image forming means; and second control means having a second storage means for storing a second program for display control of said display means, said second control means controlling said display means to change the display data of said display means in accordance with the information from said first control means.

7. An image forming apparatus according to claim 6, wherein said second control means controls said display means for dynamic display.

8. An image forming apparatus according to claim 6, wherein said second control means controls said first control means such that when said first control means receives the control information from said second control means, said first control means instructs said image forming means to initiate the image forming process.

9. An image forming apparatus according to claim 6, wherein said second control means has counting means for counting the number of image forming operations of said image forming means.

10. An image forming apparatus according to claim 9, wherein said display means displays the content of said counting means.

11. An image forming apparatus according to claim 9, wherein said counting means counts each time said image forming means terminates an image forming operation.

12. An image forming apparatus comprising:
image forming means having a plurality of process executing means for executing an image forming process;
first control means having a first storage means for storing a first program to control said image forming means, said first control means producing a first control signal to be applied to said process executing means; and
second control means having a second stage means for storing a second program to judge whether the first control signal from said first control means is produced at a normal time, said second control means having an output terminal from which a second control signal is transmitted for controlling said first control means, and an input terminal which receives the first control signal from said first control means.

13. An image forming apparatus according to claim 12, wherein said apparatus further comprises reference clock signal generating means for generating clock signals to control said process executing means, and both of said control means have counting means for counting the clock signals form said reference clock signal generating means, respectively.

14. An image forming apparatus according to claim 12, further comprising instruction means for instructing said second control means to execute the second program stored in said second storage means thereof.

15. An image forming apparatus according to claim 12, wherein said apparatus further comprises input means for entering control information into said image forming apparatus, and display means for displaying the control information from said input means, wherein said second control means controls said input means and said display means.

16. An image forming apparatus according to claim 12, further comprising informing means for informing an operator of the result judged by said second control means.

17. An image forming apparatus according to claim 16, wherein said informing means informs an operator of an abnormal control signal and the time when the abnormal control signal occurred.

18. An image forming apparatus comprising:
a plurality of process executing means for executing an image forming process;
storage means for storing data for the number of images to be formed by said process executing means;
display means for dynamically displaying the numerical data stored in said storage means; and
display control means having a memory for storing a sequence program for controlling said display means, said display control means controlling said display means such that the duty ratio of the dynamic display is substantially constant regardless of the state of image forming by said process executing means.

19. An image forming apparatus according to claim 18, wherein said display means comprises a plurality of display digit stages.

20. An image forming apparatus comprising:
a recording medium;
a plurality of process executing means for forming an image on said recording medium;
means for generating synchronous pulses in accordance with the movement of said recording medium;
first control means having first storage means for storing a first control program to count the synchronous pulses from said pulse generating means and to operate said process executing means in accordance with the counting of the synchronous pulses;
display means for displaying data for the number of images to be formed by said process executing means; and
second control means having a second storage means for storing a second control program to control said display means and to control said first control means to instruct said process executing means to initiate or terminate the image forming process.

21. An image forming apparatus according to claim 20, wherein said recording medium is a drum.

22. An image forming apparatus according to claim 20, wherein said second control means controls said display means to change the display data in accordance with the control information from said first control means.

23. An image forming apparatus according to claim 20, wherein said apparatus further comprises input means for entering data needed for the image forming process by said process executing means, and wherein said second control means has an additional storage means for storing the data entered from said input means.

24. An image forming apparatus according to claim 20, wherein said first control means has an interrupt input port and a normal input port to which the control information from said second control means is applied for controlling said first control means to instruct said process executing means to initiate or terminate the image forming process.

25. An image forming apparatus according to claim 20, wherein said first control means has an interrupt input port to which the synchronous pulses are applied, and a normal input port.

26. An image forming apparatus comprising:
a plurality of operable means including means for executing an image forming process;
a plurality of input means for entering data needed for execution of an image forming process by said image forming executing means;
first control means having a first storage means for storing a first program to read out the data entered from one of said input means and to control some of said operable means; and
second control means having a second storage means for storing a second program to read out the data entered from another one of said input means, said second control means controlling said first control means to operate some of said operable means in accordance with the data entered from said input means.

27. An image forming apparatus comprising:

image forming means having a plurality of process executing means for executing an image forming process, said image forming means including a movable member for forming an image;

first control means having a first storage means for storing a first program to control some of said process executing means, said first control means producing a first control signal to be applied to said process executing means; and second control means having a second storage means for storing a second program to judge whether said movable member is normal or abnormal, said second control means generating a signal when said movable member is abnormal.

* * * * *

UNITED STATES PATENT AND TRADEMARK OFFICE
CERTIFICATE OF CORRECTION

PATENT NO. : 4,343,036

DATED : August 3, 1982

INVENTOR(S) : KATSUICHI SHIMIZU, ET AL.

It is certified that error appears in the above-identified patent and that said Letters Patent is hereby corrected as shown below:

Column 13, line 17, "stage" should read --storage--.

Signed and Sealed this

*Twenty-first* Day of *December 1982*

[SEAL]

*Attest:*

GERALD J. MOSSINGHOFF

*Attesting Officer* *Commissioner of Patents and Trademarks*